(12) United States Patent
Suzuki et al.

(10) Patent No.: US 12,012,648 B2
(45) Date of Patent: Jun. 18, 2024

(54) ALUMINUM ALLOY FOIL

(71) Applicant: MA Aluminum Corporation, Tokyo (JP)

(72) Inventors: Takashi Suzuki, Susono (JP); Cui Qi, Susono (JP)

(73) Assignee: MA Aluminum Corporation, Tokyo (JP)

( * ) Notice: Subject to any disclaimer, the term of this patent is extended or adjusted under 35 U.S.C. 154(b) by 0 days.

(21) Appl. No.: 18/259,333

(22) PCT Filed: Mar. 11, 2022

(86) PCT No.: PCT/JP2022/010809
§ 371 (c)(1),
(2) Date: Jun. 26, 2023

(87) PCT Pub. No.: WO2022/224615
PCT Pub. Date: Oct. 27, 2022

(65) Prior Publication Data
US 2023/0392239 A1    Dec. 7, 2023

(30) Foreign Application Priority Data

Apr. 22, 2021  (JP) ................. 2021-072792

(51) Int. Cl.
| | | |
|---|---|---|
| *C22C 21/00* | (2006.01) | |
| *C22C 38/02* | (2006.01) | |
| *C22C 38/04* | (2006.01) | |
| *C22C 38/06* | (2006.01) | |
| *C22F 1/04* | (2006.01) | |

(52) U.S. Cl.
CPC .............. *C22C 38/06* (2013.01); *C22C 38/02* (2013.01); *C22C 38/04* (2013.01); *C22C 2200/00* (2013.01)

(58) Field of Classification Search
None
See application file for complete search history.

(56) References Cited

U.S. PATENT DOCUMENTS

| | | |
|---|---|---|
| 2015/0203941 A1 | 7/2015 | Seki et al. |
| 2020/0216933 A1 | 7/2020 | Suzuki |

FOREIGN PATENT DOCUMENTS

| | | | |
|---|---|---|---|
| EP | 2881478 A1 | 6/2015 | |
| JP | 2014-47372 A | 3/2014 | |
| JP | 2018-115376 A | 7/2018 | |
| JP | 2019-14940 A | 1/2019 | |
| WO | WO 2013/168606 A1 | 11/2013 | |
| WO | WO-2013168606 A1 * | 11/2013 | ............ B32B 15/08 |
| WO | WO 2014/021170 A1 | 2/2014 | |
| WO | WO 2020/137394 A1 | 7/2020 | |
| WO | WO 2021/079979 A1 | 4/2021 | |

OTHER PUBLICATIONS

International Search Report and Written Opinion dated Apr. 26, 2022 in PCT/JP2022/010809 filed on Mar. 11, 2022, 6 pages.
Chen Wei et al: "Effect of heating rate during annealing on microstructure and texture evolution of AA8021 aluminum foil", Materials Research Express, vol. 7, No. 9, Sep. 18, 2020 (Sep. 18, 2020), p. 096514, XP093113982, GB, ISSN: 2053-1591, DOI: 10.1088/2053-1591/abb7ab, Retrieved from the Internet: URL:https://iopscience.iop.org/article/10.1088/2053-1591/abb7ab/pdf>.
European Search Report mailed Jan. 16, 2024, in corresponding European Patent Application No. 22791396.9.

* cited by examiner

*Primary Examiner* — Jenny R Wu
(74) *Attorney, Agent, or Firm* — Oblon, McClelland, Maier & Neustadt, L.L.P.

(57) ABSTRACT

An aluminum alloy foil having a composition, including Fe: 1.2% by mass or more and 1.8% by mass or less, Si: 0.05% by mass or more and 0.15% by mass or less, Cu: 0.005% by mass or more and 0.10% by mass or less, and Mn: 0.01% by mass or less, with a remainder being Al and inevitable impurities. An average crystal grain size of the aluminum alloy foil is 20 to 30 μm, a maximum crystal grain size/the average crystal grain size is ≤3.0, a Cube orientation density is 5 or more, a Cu orientation density is 20 or less, and an R orientation density is 15 or less.

7 Claims, 1 Drawing Sheet

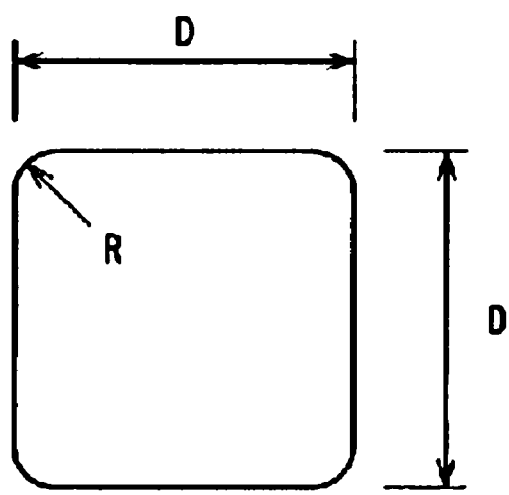

ALUMINUM ALLOY FOIL

CROSS REFERENCE TO RELATED APPLICATIONS

This application is a National Stage entry under 35 U.S.C. § 371 of PCT/JP2022/010809, filed on Mar. 11, 2022, and claims priority to Japanese Patent Application No. 2021-072792, filed on Apr. 22, 2021. The entire contents of both are incorporated herein by reference.

TECHNICAL FIELD

This invention relates to an aluminum alloy foil having excellent formability.

The present application claims priority on Japanese Patent Application No. 2021-072792 filed on Apr. 22, 2021, the content of which is incorporated herein by reference.

BACKGROUND ART

Aluminum alloy foils, which are used as packaging materials for food, lithium ion batteries, and the like, are formed by being significantly distorted by press forming or the like and are thus required to have high elongation. Conventionally, as materials having high elongation, for example, soft foils of a JIS A1000 series alloy called 1N30 or the like or a JIS A8000 series alloy such as 8079 or 8021 are in use.

Aluminum alloy foils are not distorted in one direction, but are often distorted in a plurality of directions by so-called stretch forming, and thus, regarding the elongation characteristic, are required to be high not only in elongation in a rolling direction, which is ordinarily used as an elongation value, but also in elongation in a 45° direction and elongation in a 90° direction with respect to the rolling direction.

With respect to such a request, conventionally, it has been proposed to control crystal grains in alloys in order to achieve aluminum alloy foils having high elongation.

For example, in Patent Document 1, an attempt is made to obtain high formability by specifying the average crystal grain size to be 7 to 20 µm.

In addition, in Patent Document 2, an attempt is made to obtain high formability by specifying crystal grain sizes to be as an extremely small value as 12 µm or less.

Furthermore, in Patent Document 3, a fine crystal grain texture having an average crystal grain size of 7.0 to 12.0 µm is specified.

However, in Patent Documents 1 to 3 described above, the elongation characteristic is not sufficient, and the balance between strength and elongation is not also favorable.

PRIOR ART DOCUMENTS

Patent Documents

Patent Document 1: PCT International Publication No. WO 2013/168606
Patent Document 2: Japanese Unexamined Patent Application, First Publication No. 2014-47372
Patent Document 3: Japanese Unexamined Patent Application, First Publication No. 2018-115376

DISCLOSURE OF INVENTION

Problems to be Solved by the Invention

The present invention has been made with a background of the above-described circumstances, and one object of the present invention is to provide an aluminum alloy foil having favorable workability and high formability.

Solutions for Solving the Problems

An aluminum alloy foil according to a first aspect has a composition containing Fe: 1.2% by mass or more and 1.8% by mass or less, Si: 0.05% by mass or more and by mass or less, Cu: 0.005% by mass or more and 0.10% by mass or less, and Mn: by mass or less, with a remainder being Al and inevitable impurities, an average crystal grain size of the aluminum alloy foil is 20 to 30 µm, maximum crystal grain size/average crystal grain size≤3.0, a Cube orientation density is 5 or more, a Cu orientation density is 20 or less, and an R orientation density is 15 or less.

An aluminum alloy foil according to a second aspect is the aluminum alloy foil of the first aspect, in which, in a crystal orientation analysis per unit area by electron backscatter diffraction (EBSD), a ratio of a length of a high angle grain boundary (HAGB) having an orientation difference of 15° or more to a length of a low angle grain boundary (LAGB) having an orientation difference of 2° or more and less than 15° satisfies HAGB length/LAGB length>2.0.

An aluminum alloy foil according to a third aspect is the aluminum alloy foil of the first or second aspect, in which a number density of Al—Fe-based intermetallic compounds having an equivalent circle diameter of 1.0 to 3.0 µm is $6.0 \times 10^3$ particles/mm$^2$ or less, and a number density of Al—Fe-based intermetallic compounds having an equivalent circle diameter of 0.1 µm or more and less than 1.0 µm is $1.0 \times 10^4$ particles/mm$^2$ or more.

An aluminum alloy foil according to a fourth aspect is the aluminum alloy foil according to any one of the first to third aspects, in which, in each direction at 0°, 45°, or with respect to a rolling direction, elongation is 20% or more, and a tensile strength is 90 MPa or more.

Effects of Invention

According to the aspects of the present invention, it is possible to obtain an aluminum alloy foil having a high elongation characteristic, favorable workability, and high formability.

BRIEF DESCRIPTION OF DRAWINGS

FIG. 1 is a view showing a flat surface shape of a square punch that is used in a forming limit height test in an example of the present invention.

EMBODIMENTS FOR CARRYING OUT THE INVENTION

Hereinafter, an aluminum alloy foil according to one embodiment of the present invention will be described.

Fe: 1.2% by Mass or More and 1.8% by Mass or Less

Fe crystallizes as Al—Fe-based intermetallic compounds during casting and, in a case where the size of the intermetallic compound is large, the intermetallic compound becomes a recrystallization site during annealing to have an effect of refining recrystallized grains. When the amount of Fe is less than 1.2% by mass, the distribution density of coarse intermetallic compounds becomes low, the refining effect is low, and the final crystal grain size distribution also becomes nonuniform. When the amount of Fe is more than 1.8% by mass, the effect of refining the crystal grains is saturated or reduced, furthermore, the size of the Al—Fe-based intermetallic compounds that are formed during casting becomes extremely large, and the elongation, formability, and rollability of the foil deteriorate. A particularly preferable range of the amount of Fe is 1.4% by mass at the lower limit and 1.6% by mass at the upper limit.

Si: 0.05% by Mass or More and 0.15% by Mass or Less

Si forms intermetallic compounds with Fe. When the amount of Si exceeds 0.15% by mass, coarse intermetallic compounds are formed; and thereby, the rollability and the elongation characteristic are degraded, and, furthermore, there is a concern that the uniformity in recrystallized grain sizes after final annealing may deteriorate. When the amount of Si is less than 0.05% by mass, precipitation of Fe is suppressed, the amount of solid solution Fe increases, and the fraction of continuous recrystallization increases during intermediate annealing and final annealing. When the fraction of continuous recrystallization increases, Cu orientation develops even after the recrystallization, and the uniformity in crystal grain sizes also decreases. For the above-described reasons, it is preferable to set the lower limit of the amount of Si to 0.07% and the upper limit thereof to 0.13%.

Cu: 0.005% by Mass or More and 0.10% by Mass or Less

Cu is an element that increases the strength of the aluminum foil and degrades the elongation. On the other hand, Cu has an effect of suppressing excessive work softening during cold rolling, which is reported in Al—Fe-based alloys. When the amount of Cu is less than 0.005% by mass, the effect of suppressing work softening becomes low. When the amount of Cu exceeds 0.10% by mass, the material becomes hard, and the elongation or formability clearly deteriorates. Preferably, the lower limit of the amount of Cu is 0.008%, and the upper limit thereof is 0.08% or less.

Mn: 0.01% by Mass or Less

Mn is solid-dissolved in the aluminum matrix or Mn forms extremely fine compounds and has an action of suppressing the recrystallization of aluminum. When the amount of Mn is very small, suppression of work softening can be expected as is the case with Cu. In contrast, when the added amount of Mn is large, the recrystallization during intermediate annealing and final annealing is delayed, it becomes difficult to obtain fine and uniform crystal grains, and excessive development of Cu orientation or R orientation is caused. Therefore, the amount of Mn is restricted to 0.01% or less. More preferably, the upper limit of the amount of Mn is 0.005%.

Average Crystal Grain Size 20 to 30 μm

When crystal grains in a soft aluminum foil become fine, it is possible to suppress the roughening of the foil surface when distorted, and high elongation and subsequent high formability can be expected. However, when the crystal grains become too fine, the material becomes hard, and the n value (work hardening index) decreases; and thereby, there is a concern that the elongation may conversely deteriorate. In addition, fine recrystallized grains in Al—Fe-based alloys are often obtained by continuous recrystallization, in that case, the Cu orientation density becomes extremely high even after final annealing, and the crystal grain sizes become nonuniform. Therefore, there is a concern that the formability may deteriorate. When the average crystal grain size is less than 20 μm, there is concern of an adverse influence due to the above-described refinement of the crystal grains. When the average crystal grain size exceeds 30 μm, the foil surface is roughened during forming, and this leads to deterioration in formability.

The average crystal grain size is preferably 20 μm or more and 25 μm or less.

The n value (work hardening index) is not limited, but is desirably 0.23 or more.

Maximum Crystal Grain Size/Average Crystal Grain Size≤3.0

Even when the average crystal grain sizes are the same, in a case where the grain size distribution (particle size distribution) of the crystal grains is nonuniform, local deformation is likely to occur, and the elongation or formability of the foil deteriorates. Therefore, when not only the average crystal grain size but also the maximum crystal grain size/average crystal grain size≤3.0 are satisfied, high formability can be obtained.

Furthermore, the ratio (maximum crystal grain size/average crystal grain size) is desirably set to 2.5 or less.

As Texture, Cube Orientation Density being 5 or More, Cu Orientation Density being 20 or Less, and R Orientation Density being 15 or Less The texture has a significant influence on the elongation of the foil. When the Cube orientation density is less than 5, the Cu orientation density exceeds 20, and the R orientation density also exceeds 15, significant anisotropy is caused in the elongation of the foil, and the elongation in a 45° direction with respect to a rolling direction increases; however, conversely, the elongation values in a 0° direction and in a 90° direction with respect to the rolling direction decrease. When anisotropy is caused in the elongation, uniform deformation cannot be caused during forming, and the formability deteriorates. Therefore, when the Cube orientation density of 5 or more, the Cu orientation density of or less, and the R orientation density of 15 or less are kept, it is possible to keep the balance among elongations in the three directions.

The Cube orientation density is preferably more than 6, the Cu orientation density is preferably less than 18, and the R orientation density is preferably less than 14.

The texture is a factor that is affected by a variety of factors during manufacturing. Among them, the following matters become particularly important to achieve the texture of the product of the present invention.

(1) To prevent excessive development of Cu orientation immediately before final annealing, that is, after final cold rolling, and (2) to increasing the fraction of discontinuous recrystallization in recrystallization during final annealing.

As one of the factors that satisfy (1), prevention of an excessive increase in the final cold rolling ratio from intermediate annealing to the final thickness is exemplified. Basically, as the cold rolling ratio becomes higher, the Cu orientation density increases. Regarding (2), it is desirable to decrease the amount of solid solution Fe in the aluminum matrix and to set the final cold rolling ratio to be high to a certain extent, which is contrary to (1). Recrystallization behaviors are broadly classified into continuous recrystallization and discontinuous recrystallization. When the fraction of continuous recrystallization is large, the texture after cold rolling is considerably maintained even after final annealing; and as a result, there is a tendency that the Cu orientation density is high and the Cube orientation density is low. The amount of solid solution Fe can be reduced as much as possible by optimizing the conditions for a homogenization treatment or intermediate annealing and promoting the precipitation of Fe.

"High angle grain boundary (HAGB) length/low angle grain boundary (LAGB) length>2.0"

While not limited to Al—Fe-based alloys, the proportion of the length of HAGB to the length of LAGB in total crystal grain boundaries changes depending on the recrystallization behavior during annealing. A case where the fraction of LAGB after final annealing is high is often seen in a case where the fraction of continuous recrystallization is high. For example, even when the average crystal grain size is fine, in a case where HAGB length/LAGB length≤2.0 is fulfilled, local deformation is likely to occur, and the elongation deteriorates. HAGB length/LAGB length is desirably set to larger than 2.0; and thereby, it is possible to expect improvement in formability.

For example, in Patent Document 2, a crystal grain boundary is defined as a grain boundary having an orientation difference of 5° or more obtained by EBSD. When the orientation difference is 5° or more, LAGB and HAGB are present in a mixed manner, and it becomes unclear whether recrystallized grains surrounded by HAGB are really fine.

HAGB length/LAGB length is preferably 3.0 or more.

In order to make the proportion of high angle grain boundary (HAGB) length/low angle grain boundary (LAGB) length more than 2.0, it becomes particularly important to increase the fraction of discontinuous recrystallization in recrystallization during final annealing. That is, it is important to set the final cold rolling ratio to a certain high extent while reducing the amount of solid solution Fe in the aluminum matrix by sufficiently precipitating Fe by a homogenization treatment and intermediate annealing.

Number Density of Al—Fe-Based Intermetallic Compounds Having Particle Diameter (Equivalent Circle Diameter) of 1.0 μm or More and 3.0 μm or Less: $6.0 \times 10^3$ Particles/Mm² or Less 1.0 μm or more is a particle size that is generally said to act as a nucleation site during recrystallization, when intermetallic compounds having such a particle diameter are highly densely distributed, it becomes easy to obtain fine recrystallized grains during annealing. In a case where the particle diameter is less than 1.0 μm, it is difficult for the particle to effectively act as a nucleation site during recrystallization. When the particle diameter exceeds 3.0 μm, it is likely that the generation of pinholes or the deterioration of elongation is caused. However, in a case where such coarse compounds are highly densely present, the compounds also become starting points of pinholes during forming and cause the deterioration of formability. Therefore, the distribution density (number density) of the Al—Fe-based intermetallic compounds having a particle diameter of 1.0 μm or more and 3.0 μm or less is preferably set to $6.0 \times 10^3$ particles/mm² or less.

However, when the particle density (number density) becomes extremely low, the intermetallic compounds cause the coarsening of crystal grains, and thus the particle density (number density) is desirably set to $2.0 \times 10^3$ particles/mm² or more.

The particle diameter is indicated by an equivalent circle diameter.

The density of the intermetallic compounds is determined mainly by the added amounts of Si and Fe and the conditions for the homogenization treatment. It is important to perform the homogenization treatment under appropriate conditions while selecting appropriate amounts of Fe and Si. In a case where the amount of Fe is small, the number density decreases, and, conversely, when the amount of Fe is too large, the number density exceeds the upper limit. In addition, in a case where the amount of Fe is extremely large, the intermetallic compounds are significantly coarsened, and a risk of the formation of coarse intermetallic compounds that significantly exceed 3.0 lam increases. In addition, in a case where the amount of Si is small, the number density of fine intermetallic compounds of 1.0 μm or less increases, and, conversely, in a case where the amount of Si is too large, the intermetallic compounds are coarsened. In a case where the homogenization treatment temperature is low, the number density of intermetallic compounds of 1.0 μm or more is likely to become low, and, conversely, when the homogenization treatment temperature is high, the number density of the intermetallic compounds of 1.0 μm or more increases.

Number Density of Al—Fe-Based Intermetallic Compound Having Particle Diameter (Equivalent Circle Diameter) of 0.1 μm or More and Less than 1.0 μm: $1.0 \times 10^4$ Particles/Mm² or More A particle diameter of 0.1 μm or more and less than 1.0 μm is a size that is generally said to be difficult to become a nucleus for recrystallization, but a result is obtained which implies that the particle diameter has a significant influence on the refinement of crystal grains and recrystallization behavior. While the detailed mechanism is not yet clear, it has been confirmed that, when not only coarse intermetallic compounds having a particle diameter of 1.0 to 3.0 μm but also fine compounds having a particle diameter of less than 1.0 μm are present to a certain amount, a decrease in HAGB length/LAGB length after final annealing is suppressed. There is also a possibility that the division of the crystal grains (grain subdivision mechanism) during cold rolling may be promoted. Therefore, the number density of the Al—Fe-based intermetallic compounds having a particle diameter within the above-described range is preferably set within the above-described range.

In order to adjust the above-described number density, the added amounts of Si and Fe and the conditions for the homogenization treatment become important. In a case where Fe or Si is too large, the density of the fine compounds decreases. In addition, this is also true when the homogenization temperature is too high.

Elongation: Elongation being 20% or More in Each Direction at 0°, 45°, or 90° with Respect to Rolling Direction, Strength: Tensile Strength being 90 MPa or More in Each Direction at 0°, 45°, or 90° with Respect to Rolling Direction The elongation of the foil is important so as to obtain high formability, and, in particular, when a direction parallel to the rolling direction is indicated by 0°, it is important that the elongation in each direction at 0°, 45°, or 90°, which is the normal direction to the rolling direction, is high. When all of the elongation in the 0° direction, the elongation in the 45° direction, and the elongation in the 90° direction, with respect to the rolling direction are 20% or more, high formability can be expected. In addition, in a case where the foil is used as a packaging material, it is necessary to have a certain degree of strength in order to suppress wrinkles, cracks, and the like. When all of the tensile strength in the 0° direction, the tensile strength in the 45° direction, and the tensile strength in the 90° direction, with respect to the rolling direction are 90 MPa or more, a problem is less likely to be caused even when the foil is used as a packaging material.

The elongation in each direction at 0°, 45°, or 90° with respect to the rolling direction is preferably 21.0% or more, and the tensile strength in each direction at 0°, 45°, or 90° with respect to the rolling direction is preferably 95 MPa or more.

A method for manufacturing an aluminum alloy foil according to one embodiment of the present invention will be described.

A composition containing Fe: 1.2% by mass or more and 1.8% by mass or less, Si: 0.05% by mass or more and 0.15% by mass or less, Cu: 0.005% by mass or more and by mass or less, and Mn: 0.01% by mass or less, with a remainder being Al and inevitable impurities is prepared to manufacture an aluminum alloy ingot. The method for manufacturing the ingot is not particularly limited and can be performed by an ordinary method such as direct chill casting.

A homogenization treatment of holding the obtained ingot at a temperature of 480° C. to 540° C. for 6 hours or longer is performed.

After the homogenization treatment, hot rolling is performed, and, in the hot rolling, the rolling finishing temperature is set to 230° C. or higher and lower than 300° C. After that, cold rolling is performed multiple times, and intermediate annealing is performed once or more between the cold rollings. The cold rolling ratio from the start of the cold rolling to the intermediate annealing is larger than 70% and 87% or smaller. In the intermediate annealing, the temperature is set to 300° C. to 400° C. The time of the intermediate annealing is preferably 3 hours or longer. When the time of the intermediate annealing is shorter than 3 hours, there is a possibility that the material may not soften sufficiently in a case where the annealing temperature is low. Since annealing for a long period of time of longer than 10 hours is economically not preferable, the time of the intermediate annealing is preferably 10 hours or shorter.

Cold rolling after the final intermediate annealing corresponds to final cold rolling, and the final cold rolling ratio at that time is set to 90% or larger and smaller than 95%. The final thickness of the foil is not particularly limited and can be set to, for example, 10 μm to 40 μm. In addition, after the final cold rolling, final annealing is performed at a temperature of 250° C. to 350° C. for 10 hours or longer.

Homogenization Treatment: Held at a Temperature of 480° C. to 540° C. for 6 Hours or Longer The homogenization treatment of holding the obtained ingot at a temperature of 480° C. to 540° C. for 6 hours or longer is desirably performed. When the temperature is lower than 480° C., a small amount of Fe precipitates, and the growth of the intermetallic compound becomes insufficient. On the other hand, when the temperature is higher than 540° C., the growth of the intermetallic compound is significant, and the density of the fine intermetallic compounds having a particle diameter of 0.1 μm or more and less than 1 μm significantly decreases. In such a homogenization treatment at near 500° C., a heat treatment for a long time is required to highly densely precipitate the fine intermetallic compounds, and at least 6 hours or longer needs to be ensured. When the time is shorter than 6 hours, the precipitation is not sufficient, and the density of the fine intermetallic compounds decreases.

The temperature of the homogenization treatment is preferably higher than 500° C. and lower than 530° C.

Hot Rolling: Finishing Temperature being 230° C. or Higher and Lower than 300° C.

In hot rolling, it is desirable that the finishing temperature is set to lower than 300° C. and recrystallization is suppressed. When the hot rolling finishing temperature is set to lower than 300° C., a hot-rolled sheet becomes a uniform fiber texture. When recrystallization after the hot rolling is suppressed as described above, the strain amount that is accumulated up to the sheet thickness in subsequent intermediate annealing increases, and it is possible to obtain a recrystallized grain texture having uniform grain sizes during the intermediate annealing. This also leads to the uniformity of the final crystal grain sizes. When the finishing temperature exceeds 300° C., recrystallization occurs in a part of the hot-rolled sheet, the fiber texture and the recrystallized grain texture are present in a mixed manner, and the recrystallized grain sizes during the intermediate annealing become nonuniform, and this directly leads to nonuniform final crystal grain sizes. In order to finish the hot-rolled sheet at a temperature of lower than 230° C., the temperature during the hot rolling also becomes extremely low; and therefore, there is a concern that cracks may be generated on the sides of the sheet and the productivity may significantly deteriorate.

The finishing temperature of the hot rolling is preferably 230° C. or higher and 280° C. or lower.

Intermediate Annealing: 300° C. to 400° C.

The intermediate annealing softens the material that has hardened by the repetition of the cold rolling to recover the rollability and also promotes the precipitation of Fe to reduce the amount of solid solution Fe. When the temperature is lower than 300° C., there is a risk that recrystallization may not be completed and the crystal grain texture may become nonuniform. In addition, when the temperature is a high temperature exceeding 400° C., the recrystallized grains are coarsened, and the final crystal grain sizes also increase. Furthermore, at high temperatures, the precipitate amount of Fe decreases, and the amount of solid solution Fe increases. When the amount of solid solution Fe is large, discontinuous recrystallization during the final annealing is suppressed, and the fraction of low angle grain boundaries increases. Therefore, the temperature of the intermediate annealing is desirably lower than 380° C. The holding time of the intermediate annealing is desirably 3 hours or longer. When the holding time is shorter than 3 hours, there is a concern that the recrystallization may become incomplete and the precipitation of Fe may also become insufficient. The upper limit is not particularly determined, but is desirably 15 hours or shorter and preferably 10 hours or shorter in consideration of the productivity.

Cold Rolling Ratio from Start of Cold Rolling to Intermediate Annealing being Larger than 70% and 87% or Smaller The recrystallization behaviors of Al—Fe alloys are also significantly affected by the cold rolling ratio until the heat treatment. As the rolling ratio increases, the recrystallized grains after annealing become finer; however, as the texture, the development of the Cube orientation is suppressed, whereas the Cu orientation and the R orientation become easy to develop. When cold rolling is started after the hot rolling and intermediate annealing is performed at a sheet thickness before the final thickness is achieved, it is possible to promote the development of the Cube orientation after the final annealing and to suppress the development of the Cu orientation and the R orientation. When the cold rolling ratio from the start of the cold rolling to the intermediate annealing is 70% or less, the texture becomes within the specified range, on the other hand, the recrystallized grains during the intermediate annealing become large, and, as a result, there is a concern that the crystal grains after the final annealing may coarsen. On the other hand, when the cold rolling ratio from the start of the cold rolling to the intermediate annealing exceeds 87%, the Cube orientation density after the final annealing decreases, and the Cu orientation and R orientation densities significantly increase.

Final Cold Rolling Ratio: 90% or More and Less than 95%

As the final cold rolling ratio from the end of the intermediate annealing to the final thickness becomes larger, the strain amount that is accumulated in the material becomes larger, the recrystallized grains after the final annealing are further refined, and the development of the Cu orientation becomes more significant at the same time. Conversely, in a case where the final cold rolling ratio is too small, the recrystallized grains become coarse or nonuniform. Specifically, the final cold rolling ratio is desirably controlled to be 90% or more and less than 95%. When the final cold rolling ratio is less than 90%, the crystal grain sizes after the final annealing become coarse or nonuniform due to a decrease in the accumulated strain amount. In addition, in that case, the fraction of recrystallization also increases, LAGB having an orientation difference of less than 15° increases, and HAGB length/LAGB length becomes small. On the other hand, when the final cold rolling ratio is 95% or more, the development of the Cu orientation during the cold rolling becomes significant, and the Cu orientation density becomes significantly larger even after the final annealing.

The final cold rolling ratio is preferably 92% or larger and smaller than 95%.

Final Annealing: At a Temperature of 250° C. to 350° C. for 10 Hours or Longer

The final annealing is performed after the final cold rolling, and the foil is completely softened. When the temperature is lower than 250° C. or the holding time is shorter than 10 hours, there are cases where the softening is insufficient. When the temperature exceeds 350° C., the deformation of the foil, the deterioration of the economic efficiency, or the like becomes a problem. The upper limit of the holding time is preferably shorter than 100 hours from the viewpoint of the economic efficiency.

The obtained aluminum alloy foil has an average crystal grain size of 20 to 30 μm and satisfies maximum crystal grain size/average crystal grain size≤3.0.

It is preferable that the aluminum alloy foil has a Cube density of 5 or more, a Cu orientation density of 20 or less, and an R orientation density of 15 or less. In addition, it is preferable to satisfy HAGB length/LAGB length>2.0.

The aluminum foil is excellent in terms of the balance between the excellent elongation characteristic and the strength, for example, the elongation in each direction at 45°, or 90° with respect to the rolling direction is 20% or more, the tensile strength in each direction at 0°, 45°, or 90° with respect to the rolling direction becomes 90 MPa or more, and it is possible to more favorably keep the balance between the elongations and the strength in the three directions.

In the aluminum alloy foil, the density of the intermetallic compounds desirably satisfies the following specifications.

The number density of the Al—Fe-based intermetallic compounds having a particle diameter of 1.0 to 3.0 μm is $6.0 \times 10^3$ particles/mm$^2$ or less, and the number density of the Al—Fe-based intermetallic compounds having a particle diameter of 0.1 jam or more and less than 1.0 μm is $1.0 \times 10^4$ particles/mm$^2$ or more.

The aluminum alloy foil can be distorted by press forming or the like and can be suitably used as a packaging material for food or lithium ion batteries or the like. The present embodiment does not limit the use of the aluminum alloy foil to the above description, and the aluminum alloy foil can be used in appropriate uses.

Examples

Ingots of aluminum alloys having compositions shown in Table 1 (a remainder was Al and inevitable impurities) were produced by a direct chill casting method. Subsequently, the obtained ingots were subjected to a homogenization treatment, hot rolling, cold rolling, intermediate annealing, additional cold rolling, and final annealing were performed under manufacturing conditions shown in Table 2 (conditions for the homogenization treatment, finishing temperatures of the hot rolling, sheet thicknesses at the time of the intermediate annealing, cold rolling ratios until the intermediate annealing, intermediate annealing conditions, and final cold rolling ratios); and thereby, aluminum alloy foils were manufactured. Conditions for the final annealing were set to 300° C.×20 hours.

The thicknesses of the foils were set to 40 μm.

TABLE 1

| | | Chemical components (mass %) | | | |
|---|---|---|---|---|---|
| No. | | Si | Fe | Cu | Mn |
| Example | 1 | 0.10 | 1.4 | 0.01 | 0.005 |
| | 2 | 0.06 | 1.5 | 0.01 | 0.004 |
| | 3 | 0.13 | 1.4 | 0.01 | 0.005 |
| | 4 | 0.10 | 1.3 | 0.01 | 0.004 |
| | 5 | 0.11 | 1.5 | 0.01 | 0.005 |
| | 6 | 0.10 | 1.4 | 0.007 | 0.008 |
| | 7 | 0.10 | 1.4 | 0.08 | 0.005 |
| | 8 | 0.07 | 1.5 | 0.01 | 0.005 |
| | 9 | 0.14 | 1.3 | 0.01 | 0.004 |
| | 10 | 0.13 | 1.4 | 0.01 | 0.005 |
| | 11 | 0.06 | 1.6 | 0.01 | 0.005 |
| Comparative Example | 12 | 0.03 | 1.4 | 0.01 | 0.005 |
| | 13 | 0.18 | 1.6 | 0.01 | 0.004 |
| | 14 | 0.10 | 1.0 | 0.01 | 0.005 |
| | 15 | 0.10 | 1.9 | 0.01 | 0.005 |
| | 16 | 0.10 | 1.4 | 0.001 | 0.004 |
| | 17 | 0.10 | 1.4 | 0.14 | 0.005 |
| | 18 | 0.11 | 1.5 | 0.01 | 0.04 |
| | 19 | 0.10 | 1.4 | 0.01 | 0.005 |
| | 20 | 0.10 | 1.4 | 0.01 | 0.005 |
| | 21 | 0.12 | 1.5 | 0.01 | 0.005 |

TABLE 2

| | | Manufacturing conditions | | | | | | |
|---|---|---|---|---|---|---|---|---|
| | | Homogenization treatment | | Hot rolling finishing | Intermediate annealing | | | Final |
| | | Temperature (° C.) | Time (h) | temperature (° C.) | Sheet thickness (mm) | Cold rolling ratio (%) | Temperature (° C.) | Time (h) | cold rolling ratio (%) |
| Example | 1 | 520 | 6 | 260 | 0.5 | 83.3 | 360 | 4 | 92.0 |
| | 2 | 520 | 6 | 273 | 0.5 | 83.3 | 360 | 4 | 92.0 |
| | 3 | 520 | 6 | 265 | 0.5 | 83.3 | 360 | 4 | 92.0 |
| | 4 | 520 | 6 | 255 | 0.5 | 83.3 | 360 | 4 | 92.0 |
| | 5 | 520 | 6 | 262 | 0.5 | 83.3 | 360 | 4 | 92.0 |
| | 6 | 520 | 6 | 279 | 0.5 | 83.3 | 360 | 4 | 92.0 |
| | 7 | 520 | 6 | 270 | 0.5 | 83.3 | 360 | 4 | 92.0 |
| | 8 | 520 | 10 | 242 | 0.7 | 76.7 | 360 | 4 | 94.3 |

TABLE 2-continued

| | No. | Homogenization treatment Temperature (° C.) | Homogenization treatment Time (h) | Hot rolling finishing temperature (° C.) | Intermediate annealing Sheet thickness (mm) | Intermediate annealing Cold rolling ratio (%) | Intermediate annealing Temperature (° C.) | Intermediate annealing Time (h) | Final cold rolling ratio (%) |
|---|---|---|---|---|---|---|---|---|---|
| | 9 | 540 | 6 | 289 | 0.5 | 83.3 | 360 | 4 | 92.0 |
| | 10 | 480 | 6 | 290 | 0.4 | 86.7 | 300 | 4 | 90.0 |
| | 11 | 480 | 6 | 237 | 0.7 | 76.7 | 300 | 4 | 94.3 |
| Comparative | 12 | 520 | 6 | 251 | 0.5 | 83.3 | 360 | 4 | 92.0 |
| Example | 13 | 520 | 6 | 263 | 0.5 | 83.8 | 360 | 4 | 92.0 |
| | 14 | 520 | 6 | 254 | 0.5 | 83.8 | 360 | 4 | 92.0 |
| | 15 | 520 | 6 | 277 | 0.5 | 83.8 | 360 | 4 | 92.0 |
| | 16 | 520 | 6 | 266 | 0.5 | 83.8 | 360 | 4 | 92.0 |
| | 17 | 520 | 6 | 264 | 0.5 | 83.8 | 360 | 4 | 92.0 |
| | 18 | 520 | 6 | 244 | 0.5 | 83.8 | 360 | 4 | 92.0 |
| | 19 | 520 | 3 | 270 | 0.1 | 96.7 | 360 | 4 | 60.0 |
| | 20 | 520 | 6 | 267 | — | — | — | — | 98.7 |
| | 21 | 520 | 6 | 271 | 1.5 | 50.0 | 360 | 4 | 97.3 |

In Comparative Example No. 20, intermediate annealing was not performed; and therefore, the rolling ratio from the thickness at the end of the hot rolling (3 mm) to the final thickness (40 μm) is described as the final cold rolling ratio.

For the obtained aluminum alloy foils, the following characteristics were measured and evaluated.

Tensile Strength and Elongation

Both of the tensile strength and the elongation were measured by a tensile test. The tensile test conformed to JIS Z 2241, JIS No. 5 test pieces were taken from a specimen so that the elongation in each direction at 0°, 45°, or 90° with respect to a rolling direction could be measured, and the test was performed with a universal tensile tester (AGS-X 10 kN manufactured by Shimadzu Corporation) at a tensile rate of 2 mm/min.

An elongation rate was calculated as described below. First, before the test, two lines were marked in the vertical direction of the test piece at an interval of 50 mm, which was a gauge length, in the longitudinal center of the test piece. After the test, the broken surfaces of the aluminum alloy foil were matched, the distance between the marks was measured, and the elongation amount (mm) obtained by subtracting the gauge length (50 mm) from the measured distance was divided by the gauge length (50 mm) to obtain the elongation rate.

Crystal Grain Size

Each aluminum alloy foil was immersed in a mixed solution of 20% by volume of perchloric acid and 80% by volume of ethanol, and electrolytic polishing was performed at a voltage of 20V. Next, the aluminum alloy foil was washed with water, and an anodized film was formed in an aqueous solution of 5% by volume of fluoroboric acid at a voltage of 30 V. Next, crystal grains were observed and photographed with a polarized optical microscope. The average crystal grain size was measured by an intercept method from crystal grain photographs. In detail, 3 photographs having a size of 267×356 μm were captured at a 200-fold magnification, 3 vertical straight lines and 3 horizontal straight lines were drawn on each photograph, the number of crystal grains present on the lines was counted, and the lengths of the straight lines was divided by the number of the crystal grains; and thereby, the average crystal grain size was calculated. In addition, among the lengths of the straight lines that were cut by the contour of one crystal grain, the maximum length was regarded as the maximum crystal grain size.

HAGB Length/LAGB Length

The foil surface was electrolytically polished. Next, the crystal orientation was analyzed with an SEM-EBSD device, and high angle grain boundaries (HAGB) having an orientation difference between the crystal grains of 15° or more and low angle grain boundaries (LAGB) having an orientation difference of 2° or more and less than 15° were observed. Three visual fields having a visual field size of 45×90 μm were measured at a 1000-fold magnification, the lengths of HAGB and LAGB in the visual fields were obtained, and the ratio of HAGB length/LAGB length was calculated.

Forming Limit Height

The forming height was evaluated by a square tube forming test. The test was performed on the aluminum foil having a thickness of 30 μm with a universal thin sheet forming tester (manufactured by Erichsen, Inc. model 142/20) using a square punch having a shape shown in FIG. 1 (the length L of one side=37 mm, the chamfer diameter R of a corner part=4.5 mm). As test conditions, the wrinkle suppressing force was 10 kN, the scale of the punch rising rate (forming rate) was set to 1, and mineral oil was coated as a lubricant on one surface (a surface where the punch was about to hit) of the foil. The foil was formed with the punch that rose from the lower portion of the device and hit the foil, and the maximum height that the punch rose when the foil could be formed without cracks or pinholes after being continuously formed three times was specified as the forming limit height (mm) of the material. The height of the punch was changed at intervals of 0.5 mm. In the present invention products, in a case where the forming height was 8.0 mm or more, the formability was determined as favorable (acceptable).

Number Density of Intermetallic Compounds

A parallel cross section (RD-ND surface) of the foil was cut with a CP (cross section polisher), and intermetallic compounds were observed with a field-emission scanning electron microscope (FE-SEM: NVision 40 manufactured by Carl Zeiss AG). Regarding "Al—Fe-based intermetallic compounds having a particle diameter (equivalent circle diameter) of 1.0 μm or more and 3.0 μm or less", image analysis was performed on visual fields observed at a 2000-fold magnification, and the number density was calculated. Regarding "Al—Fe-based intermetallic compounds having a particle diameter (equivalent circle diameter) of 0.1 µm or more and less than 1.0 µm", image analysis was performed on 10 visual fields observed at a 10000-fold magnification with open source image analysis software ImageJ, and the number density was calculated. The particle diameters of the intermetallic compounds were obtained from the equivalent circle diameters with the image analysis software ImageJ.

Crystal Orientation Density

The typical orientation of the Cube orientation was set to {001}<100>, the typical orientation of the Cu orientation was set to {112}<111>, and the typical orientation of the R orientation was set to {123}<634>.

Each orientation density was evaluated by measuring the incomplete pole figures of {200}, {220}, and {111} by the X-ray diffraction method and calculating a three-dimensional orientation distribution function (ODF) using the results.

The results of each measurement were shown in Tables 3 and 4.

TABLE 3

| | | Crystal grain texture | | | | | Intermetallic compound | |
|---|---|---|---|---|---|---|---|---|
| | | Average grain size (µm) | Grain size ratio | HAGB/LAGB | Texture | | 1.0 to 3.0 µm (× 10³) particles/mm² | 0.1 to 1.0 µm (× 10⁴) particles/mm² |
| No. | | | | | Cube orientation | Cu orientation | R orientation | | |
| Example | 1 | 23.6 | 2.2 | 3.4 | 9.0 | 16.5 | 12.7 | 4.2 | 3.6 |
| | 2 | 21.8 | 1.8 | 3.6 | 7.6 | 18.5 | 13.3 | 2.7 | 5.1 |
| | 3 | 24.7 | 2.5 | 3.0 | 9.8 | 14.6 | 11.9 | 5.4 | 2.9 |
| | 4 | 26.9 | 2.7 | 2.8 | 11.8 | 13.1 | 11.0 | 3.1 | 2.8 |
| | 5 | 21.0 | 2.0 | 3.3 | 7.4 | 17.0 | 12.8 | 6.2 | 4.2 |
| | 6 | 24.2 | 2.6 | 2.5 | 10.6 | 15.8 | 12.1 | 4.1 | 3.7 |
| | 7 | 23.1 | 2.1 | 3.5 | 8.0 | 17.6 | 13.5 | 4.2 | 3.5 |
| | 8 | 21.1 | 2.1 | 3.4 | 6.5 | 18.1 | 12.6 | 5.5 | 5.3 |
| | 9 | 28.9 | 2.3 | 3.3 | 12.9 | 12.1 | 10.0 | 2.7 | 2.2 |
| | 10 | 25.9 | 2.8 | 2.8 | 10.8 | 14.9 | 12.4 | 5.0 | 3.3 |
| | 11 | 21.2 | 2.7 | 2.4 | 5.9 | 18.9 | 14.0 | 2.9 | 4.7 |
| Comparative Example | 12 | 14.8 | 3.4 | 3.3 | 5.4 | 19.6 | 14.5 | 2.3 | 6.2 |
| | 13 | 30.9 | 2.8 | 2.6 | 11.5 | 14.0 | 10.2 | 6.9 | 1.8 |
| | 14 | 32.8 | 2.9 | 1.8 | 13.8 | 12.0 | 10.5 | 1.6 | 1.2 |
| | 15 | 18.9 | 2.4 | 1.6 | 5.5 | 17.9 | 13.6 | 7.0 | 5.1 |
| | 16 | 24.5 | 3.9 | 2.7 | 10.9 | 15.2 | 11.8 | 4.1 | 3.6 |
| | 17 | 23.6 | 2.4 | 3.4 | 7.0 | 18.0 | 13.1 | 4.3 | 3.7 |
| | 18 | 26.5 | 3.4 | 2.3 | 4.4 | 22.8 | 16.9 | 4.4 | 3.5 |
| | 19 | 36.7 | 2.0 | 1.3 | 13.9 | 14.0 | 10.1 | 3.8 | 3.9 |
| | 20 | 8.8 | 3.6 | 1.4 | 2.0 | 50.1 | 29.9 | 3.8 | 3.7 |
| | 21 | 10.2 | 2.9 | 1.7 | 4.2 | 36.2 | 20.8 | 4.3 | 3.9 |

TABLE 4

| | | Mechanical properties | | | | | | Forming limit height (mm) |
|---|---|---|---|---|---|---|---|---|
| | | Elongation (%) | | | Tensile strength (MPa) | | | |
| No. | | 0° | 45° | 90° | 0° | 45° | 90° | |
| Example | 1 | 22.4 | 26.4 | 21.8 | 99 | 96 | 97 | 8.8 |
| | 2 | 23.9 | 27.6 | 22.4 | 105 | 99 | 101 | 9.1 |
| | 3 | 21.7 | 25.7 | 20.9 | 97 | 94 | 95 | 8.6 |
| | 4 | 20.4 | 25.1 | 20.3 | 94 | 92 | 94 | 8.3 |
| | 5 | 23.4 | 27.2 | 22.2 | 107 | 100 | 103 | 8.8 |
| | 6 | 22.1 | 26.0 | 21.6 | 95 | 93 | 94 | 8.7 |
| | 7 | 21.2 | 25.4 | 20.4 | 98 | 94 | 96 | 8.4 |
| | 8 | 21.3 | 26.9 | 20.5 | 110 | 102 | 106 | 8.6 |
| | 9 | 20.1 | 24.5 | 20.0 | 92 | 91 | 91 | 8.2 |
| | 10 | 21.6 | 25.5 | 20.7 | 96 | 95 | 95 | 8.4 |
| | 11 | 20.8 | 27.7 | 20.4 | 109 | 99 | 102 | 8.2 |
| Comparative Example | 12 | 20.1 | 28.9 | 19.8 | 118 | 110 | 112 | 7.7 |
| | 13 | 21.2 | 25.0 | 20.7 | 93 | 90 | 91 | 7.6 |
| | 14 | 18.4 | 23.5 | 18.0 | 88 | 86 | 88 | 7.4 |
| | 15 | 21.5 | 25.9 | 21.3 | 110 | 102 | 104 | 6.9 |
| | 16 | 18.9 | 24.8 | 18.6 | 90 | 86 | 88 | 7.4 |
| | 17 | 20.1 | 24.8 | 19.6 | 105 | 99 | 101 | 7.5 |
| | 18 | 20.1 | 26.9 | 19.6 | 96 | 88 | 91 | 7.6 |
| | 19 | 17.6 | 22.5 | 17.3 | 84 | 83 | 83 | 6.7 |
| | 20 | 20.4 | 29.7 | 19.5 | 119 | 109 | 111 | 7.6 |
| | 21 | 20.9 | 29.4 | 19.9 | 115 | 104 | 108 | 7.2 |

As shown in Tables 3 and 4, examples satisfied the requirements of the present embodiment, and favorable characteristics were obtained in terms of elongation, tensile strength, and forming limit height. The tensile strength was 90 MPa or more in each direction at 0°, 45°, or 90° with respect to the rolling direction. In contrast, comparative examples did not satisfy any one or more of the requirements of the present embodiment, and favorable characteristics were not obtained.

In Comparative Example 12, since the amount of Si was less than the lower limit of the range of the present embodiment, the coarsening and nonuniformity of crystal grains were caused, and a sufficient forming height was not obtained.

In Comparative Example 13, since the amount of Si exceeded the upper limit of the range of the present embodiment, the coarsening of crystal grains was caused, and the number density of intermetallic compounds having a particle diameter of 1.0 to 3.0 increased. Therefore, a sufficient forming height could not be obtained.

INDUSTRIAL APPLICABILITY

The aluminum alloy foil of the present embodiment is suitably applied as a packaging material for food or lithium ion batteries.

EXPLANATION OF REFERENCE SIGNS

D: Length of one side
R: Chamfer diameter

What is claimed is:

1. An aluminum alloy foil having a composition, comprising: Fe: 1.2% by mass or more and 1.8% by mass or less; Si: 0.05% by mass or more and 0.15% by mass or less; Cu: 0.005% by mass or more and 0.10% by mass or less; and Mn: 0.01% by mass or less, with a remainder being aluminum and inevitable impurities, wherein an average crystal grain size of the aluminum alloy foil is 21.0-28.9 μm, a maximum crystal grain size/the average crystal grain size is <3.0, a Cube orientation density is 5 or more, a Cu orientation density is 20 or less, and an R orientation density is 15 or less.

2. The aluminum alloy foil according to claim 1, wherein, in a crystal orientation analysis per unit area by electron backscatter diffraction (EBSD), a ratio of a length of a high angle grain boundary (HAGB) having an orientation difference of 15° or more to a length of a low angle grain boundary (LAGB) having an orientation difference of 2° or more and less than 15° satisfies HAGB length/LAGB length >2.0.

3. The aluminum alloy foil according to claim 1, wherein a number density of Al—Fe-based intermetallic compounds having an equivalent circle diameter of 1.0 to 3.0 μm is $6.0 \times 10^3$ particles/mm$^2$ or less, and a number density of Al—Fe-based intermetallic compounds having an equivalent circle diameter of 0.1 μm or more and less than 1.0 μm is $1.0 \times 10^4$ particles/mm$^2$ or more.

4. The aluminum alloy foil according to claim 1, wherein, in each direction at 0°, 45°, or 90° with respect to a rolling direction, elongation is 20% or more, and a tensile strength is 90 MPa or more.

5. The aluminum alloy foil according to claim 2, wherein a number density of Al—Fe-based intermetallic compounds having an equivalent circle diameter of 1.0 to 3.0 μm is $6.0 \times 10^3$ particles/mm$^2$ or less, and a number density of Al—Fe-based intermetallic compounds having an equivalent circle diameter of 0.1 μm or more and less than 1.0 μm is $1.0 \times 10^4$ particles/mm$^2$ or more.

6. The aluminum alloy foil according to claim 2, wherein, in each direction at 0°, 45°, or 90° with respect to a rolling direction, elongation is 20% or more, and a tensile strength is 90 MPa or more.

7. The aluminum alloy foil according to claim 3, wherein, in each direction at 0°, 45', or 90° with respect to a rolling direction, elongation is 70% or more, and a tensile strength is 90 MPa or more.

* * * * *